United States Patent
Ma et al.

(10) Patent No.: US 9,088,559 B2
(45) Date of Patent: Jul. 21, 2015

(54) SYSTEM AND METHOD FOR SHARING LOGIN STATUS BETWEEN AN APPLICATION PLATFORM AND AN APPLICATION

(71) Applicant: Tencent Technology (Shenzhen) Company Limited, Shenzhen (CN)

(72) Inventors: Liang Ma, Shenzhen (CN); Zhiqiang He, Shenzhen (CN); Cheng Guo, Shenzhen (CN); Linbo Zhang, Shenzhen (CN); Xiaojing Tu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 77 days.

(21) Appl. No.: 14/080,677

(22) Filed: Nov. 14, 2013

(65) Prior Publication Data

US 2014/0075521 A1    Mar. 13, 2014

Related U.S. Application Data

(63) Continuation of application No. PCT/CN2013/083180, filed on Sep. 10, 2013.

(30) Foreign Application Priority Data

Sep. 11, 2012    (CN) .......................... 2012 1 0334289

(51) Int. Cl.
*H04L 29/06*    (2006.01)

(52) U.S. Cl.
CPC .............. *H04L 63/08* (2013.01); *H04L 63/061* (2013.01); *H04L 63/0876* (2013.01); *H04L 63/168* (2013.01)

(58) Field of Classification Search
None
See application file for complete search history.

(56) References Cited

U.S. PATENT DOCUMENTS

| 8,935,315 B2 * | 1/2015 | Hudson et al. ................ 709/203 |
| 2003/0177400 A1* | 9/2003 | Raley et al. ................... 713/201 |

(Continued)

FOREIGN PATENT DOCUMENTS

| CN | 101783873 A | 7/2010 |
| CN | 102469080 A | 5/2012 |
| WO | WO 2004095806 A2 | 11/2004 |

OTHER PUBLICATIONS

Huang et al., Design and Implementation of Single Sign on System with Cluster CAS for Public Service Platform of Scien and Technology Evaluation, 2011 IEEE, 6 pages.*

(Continued)

*Primary Examiner* — Jeffrey Pwu
*Assistant Examiner* — Baotram Tran
(74) *Attorney, Agent, or Firm* — Morgan, Lewis & Bockius LLP

(57) ABSTRACT

A method for sharing login status between an application platform and an application, both running on a client device, is performed at a computer. In response to a login request from the client device, the computer analyzes the login request to determine whether the login request is associated with the application platform or the application. If the login request is with the application platform, the computer then establishes a first connection with an application platform server and forwards the login request to the application platform server. Upon receiving a login key from the application platform server, the computer returns the login key to the client device. If not, the computer establishes a second connection with an application server and forwards the login request to the application server. Upon receiving a login key from the application server, the computer then returns the login key to the client device.

16 Claims, 6 Drawing Sheets

(56) References Cited

U.S. PATENT DOCUMENTS

| | | |
|---|---|---|
| 2004/0220996 A1* | 11/2004 | Huang et al. ............... 709/201 |
| 2009/0249418 A1* | 10/2009 | Alastruey Gracia et al. . 725/114 |
| 2010/0325427 A1* | 12/2010 | Ekberg et al. ............... 713/156 |
| 2011/0093923 A1* | 4/2011 | Yau et al. ..................... 726/4 |
| 2011/0247047 A1* | 10/2011 | Loureiro et al. .............. 726/1 |
| 2011/0314389 A1* | 12/2011 | Meredith et al. ............ 715/751 |
| 2012/0023565 A1* | 1/2012 | Tumanyan ..................... 726/8 |
| 2012/0096544 A1 | 4/2012 | Hosoda |
| 2012/0163589 A1* | 6/2012 | Johnson et al. ............. 380/30 |
| 2012/0179587 A1* | 7/2012 | Hill et al. .................... 705/34 |
| 2012/0239620 A1* | 9/2012 | Masini et al. ............... 707/634 |
| 2012/0297175 A1* | 11/2012 | Ekberg ........................ 713/1 |
| 2013/0108051 A1* | 5/2013 | Sandler et al. .............. 380/277 |
| 2013/0144633 A1* | 6/2013 | Guadarrama et al. ...... 705/1.1 |
| 2013/0232336 A1* | 9/2013 | Cheung et al. ............. 713/156 |

OTHER PUBLICATIONS

Kapil Singh, xAccess: A Unified User-Centric Access Control Framwork for Web Applications, IBM T.J Watson Research Center, 2012 IEEE, 4 pages.*

Bicakci et al., A Multi-Word Password Proposal (gridWord) and Exploring Questions about Science in Security Research and Usable Security Evaluation, copy right 2011, NSPW California.*

Tencent Technology, ISRWO, PCT/CN2013/083180, Dec. 12, 2013, 11 pgs.

* cited by examiner

SYSTEM AND METHOD FOR SHARING LOGIN STATUS BETWEEN AN APPLICATION PLATFORM AND AN APPLICATION

RELATED APPLICATIONS

This application is a continuation application of PCT Patent Application No. PCT/CN2013/083180, entitled "SYSTEM AND METHOD FOR SHARING LOGIN STATUS BETWEEN AN APPLICATION PLATFORM AND AN APPLICATION" filed on Sep. 10, 2013, which claims priority to Chinese Patent Application No. 201210334289.1, entitled "SYSTEM AND METHOD FOR SHARING LOGIN STATUS BETWEEN AN APPLICATION PLATFORM AND AN APPLICATION," filed on Sep. 11, 2012, both of which are incorporated by reference in their entirety.

FIELD OF THE INVENTION

The present invention generally relates to Internet technology, in particular to system and method for sharing login status between an application platform and an application through information exchanges.

BACKGROUND OF THE INVENTION

In a client-server environment, a user at a client device submits requests to a remote server for accessing data managed by the remote server. The remote server performs corresponding operations on the data and returns processing results to the client device. Typical requests include login request, logout request, etc. An online gaming application is an example implemented in this type of environment. A user of the online gaming application needs to log into his/her account in order to play the game. But if an online game vendor offers multiple games to end users and these games are hosted by different servers in different network domains, a user may have to log into different servers separately by repeatedly entering his/her login information. In some cases, the vender may provide an online game platform to be downloaded to the client device so that an end user can see all the games that he or she can play with. Although this online game platform makes it easier for an end user to manage the game applications that he or she has registered, it may still require that the end user log into different game servers if, e.g., a server communicating with the game platform is different from a game server that supports a particular game application although the client-end of the game application is managed by the game platform. This configuration would require a cross-domain visit.

Currently, technologies for achieving cross-domain visits include: (i) establishing an agent in a server within one network domain such that, when a client device sends a request to the agent, the agent automatically submits a new request to a destination server within a different network domain and then returns the response from the destination server to the client device with or without any update; (ii) using On-Demand Javascript to dynamically generate a new <script> object and specifying in the source attribute the address of the destination server, which then returns a response in the format of Javascript using, e.g., JSON messages; and (iii) dynamically embedding in a webpage IFRAME pointing to the destination server such that the two servers can exchange messages by altering each other's anchor hash fragments. But none of the approaches above can easily solve the problem of sharing login status information between servers within different domains.

SUMMARY

The above deficiencies and other problems associated with the conventional approach of sharing information between different servers are reduced or eliminated by the invention disclosed below. In some embodiments, the invention is implemented in a computer system that has one or more processors, memory and one or more modules, programs or sets of instructions stored in the memory for performing multiple functions. Instructions for performing these functions may be included in a computer program product configured for execution by one or more processors.

One aspect of the invention involves a computer-implemented method performed by a computer having one or more processors and memory. The computer-implemented method includes: receiving a login request from a client device; analyzing the login request to determine whether the login request is associated with an application platform at the client device or an application at the client device, wherein the application is managed by the application platform; if the login request is associated with the application platform: establishing a first connection with an application platform server; forwarding the login request to the application platform server; receiving a login key from the application platform server; and returning the login key to the client device, wherein the login key is associated with the application platform; if the login request is associated with the application: establishing a second connection with an application server, wherein the application server is distinct from the application platform server; forwarding the login request to the application server; receiving a login key from the application server; and returning the login key to the client device, wherein the login key is associated with the application.

Another aspect of the invention involves a computer system. The computer system includes memory, one or more processors, and one or more programs stored in the memory and configured for execution by the one or more processors. The one or more programs include: receiving a login request from a client device; analyzing the login request to determine whether the login request is associated with an application platform at the client device or an application at the client device, wherein the application is managed by the application platform; if the login request is associated with the application platform: establishing a first connection with an application platform server; forwarding the login request to the application platform server; receiving a login key from the application platform server; and returning the login key to the client device, wherein the login key is associated with the application platform; if the login request is associated with the application: establishing a second connection with an application server, wherein the application server is distinct from the application platform server; forwarding the login request to the application server; receiving a login key from the application server; and returning the login key to the client device, wherein the login key is associated with the application.

Another aspect of the invention involves a non-transitory computer readable storage medium having stored therein one or more programs for execution by one or more processors of a computer system, the one or more programs including instructions for: receiving a login request from a client device; analyzing the login request to determine whether the login request is associated with an application platform at the client device or an application at the client device, wherein the application is managed by the application platform; if the login request is associated with the application platform: establishing a first connection with an application platform server; forwarding the login request to the application platform server; receiving a login key from the application platform server; and returning the login key to the client device, wherein the login key is associated with the application platform; if the login request is associated with the application: establishing a second connection with an application server, wherein the application server is distinct from the application platform server; forwarding the login request to the application server; receiving a login key from the application server; and returning the login key to the client device, wherein the login key is associated with the application.

BRIEF DESCRIPTION OF THE DRAWINGS

The aforementioned features and advantages of the invention as well as additional features and advantages thereof will be more clearly understood hereinafter as a result of a detailed description of preferred embodiments when taken in conjunction with the drawings.

Like reference numerals refer to corresponding parts throughout the several views of the drawings.

DESCRIPTION OF EMBODIMENTS

Figure 1:
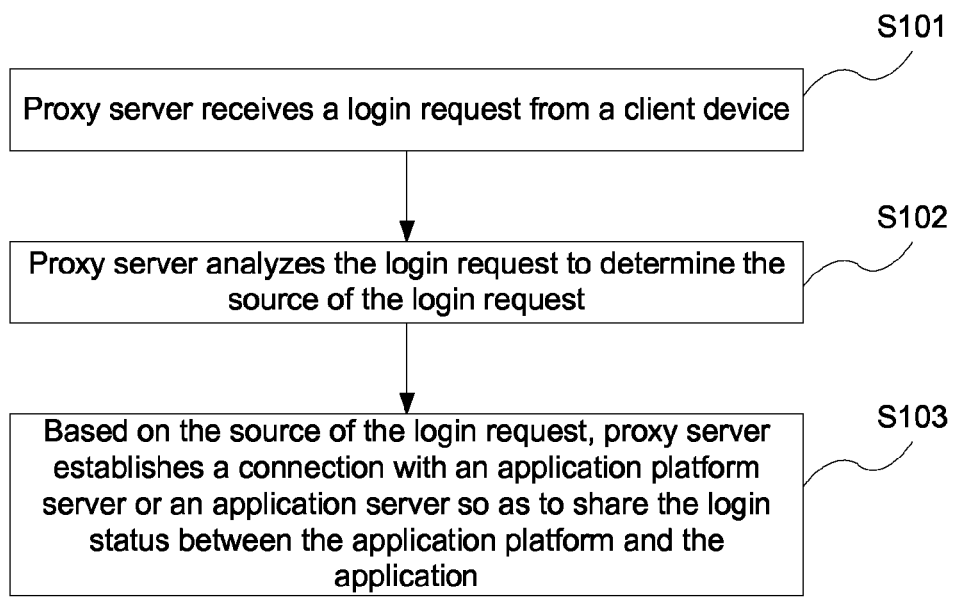
FIG. 1 is a flow chart illustrative of a method of sharing login status information between an application platform and an application in accordance with some embodiments.

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

As noted above, there is a challenge for two programs running on the client-side to securely share their login status information with two servers within different domains. For illustrative purpose, the present application uses QQ's online game application platform and a particular game application managed by the online game application platform as an example. In this case, both the online game application platform and the particular game application are installed on a client device such as a desktop, laptop, tablet, or a smartphone and there is a WebSocket connection between the client device and a remote proxy server. Both the online game application platform and the particular game application exchange data with the proxy server through the WebSocket connection. The proxy server determines the data it receives from the client device is from the online game application platform or the particular game application. On the server-side, the proxy server maintains connections with servers within different domains. If the data is from the online game application platform, the proxy server then forwards the data to the corresponding online game application platform server within one domain; if the data is from the particular game application, the proxy server then forwards the data to the corresponding game application server within another domain. The proxy server also keeps track of the login status information of the online game application platform and the particular game application at the respective servers such that the two client-side programs can share their respective login status information with each other. By doing so, a user that has logged into his/her account through the online game application platform within one domain can access the particular game application server without having to provide his/her login information to the server as long as the particular game application server has the login status of the user at the corresponding online game application platform server.

Below is a list of technologies used by the present invention:

WebSocket: WebSocket is a web technology providing full-duplex communications channels over a single TCP connection. WebSocket is designed to be implemented in web browsers and web servers, but it can be used by any client or server application. The WebSocket Protocol is an independent TCP-based protocol. Its only relationship to HTTP is that its handshake is interpreted by HTTP servers as an Upgrade request. The WebSocket protocol makes possible more interaction between a browser and a web site, facilitating live content and the creation of real-time games. This is made possible by providing a standardized way for the server to send content to the browser without being solicited by the client, and allowing for messages to be passed back and forth while keeping the connection open. In this way a two-way (bi-directional) ongoing conversation can take place between a browser and the server.

Ajax: Ajax is an acronym for "asynchronous JavaScript and XML," which is a group of interrelated web development techniques used on the client-side to create asynchronous web applications. With Ajax, web applications can send data to, and retrieve data from, a server asynchronously (in the background) without interfering with the display and behavior of the existing page. Data can be retrieved using the XMLHttpRequest object. Note that Ajax is not a single technology, but a group of technologies. HTML and CSS can be used in combination to mark up and style information. The DOM is accessed with JavaScript to dynamically display, and allow the user to interact with, the information presented. JavaScript and the XMLHttpRequest object provide a method for exchanging data asynchronously between browser and server to avoid full page reloads.

JCE: JCE stands for "Java Cryptography Extension," which provides a framework and implementation for encryption, key generation and key agreement, and Message Authentication Code (MAC) algorithms. JCE supplements the Java platform, which already includes interfaces and implementations of message digests and digital signatures.

LocalStorage: LocalStorage is part of the web data storage protocol on the Internet. Data placed in LocalStorage is per origin (the combination of protocol, hostname, and port number as defined in the same origin policy) and the data is available to all scripts loaded from web pages from the same origin that previously stored the data and it persists after the web browser is closed.

JSON: JSON is an acronym for JavaScript Object Notation, which is a lightweight, text-based open standard designed for human-readable data interchange. It is derived from the JavaScript scripting language for representing simple data structures and associative arrays, called objects. Despite its relationship to JavaScript, it is language-independent, with parsers available for many languages.

Login Key: Login key is an encryption key released by a backend server to a client device after the login request from the client device succeeds at the backend server. The login key has a limited term of life during which the client device can access the backend server without having to provide more login information.

FIG. 1 is a flow chart illustrative of a method of sharing login status information between an application platform and an application in accordance with some embodiments. In this example, it is assumed that both the application platform and the application are installed on a client device that is connected to a proxy server, wired or wireless. The application platform is a special application that manages multiple applications. However, different applications (including the application platform) may correspond to different backend servers within different network domains. For example, the application platform may correspond to an application platform server within one domain and the application, which is managed by the application platform at the client device, may correspond to an application server within a different network domain. Typically, a user has to log into his/her account at the two different servers separately in order to access the service provided by the two servers. But as will be described below, a method is implemented at the proxy server that allows the user to access one server (e.g., the application server) using the login status information (e.g., the login key) provided by the other server (e.g., the application platform server).

At step S101, the proxy server receives a login request from a client device. As noted above, there is a WebSocket connection between the client device and the proxy server. A user first submits a login request from one of the application platform and the application to the proxy server using the Web-Socket connection if the user has not logged into either server before. In some embodiments, the login request includes one or more related data packets and at least one of the data packets includes a login request type bit for the proxy server to determine which the login request is initiated by the application platform or the application.

At step S102, the proxy server analyzes the login request to determine the source of the login request. For example, the proxy server exacts the login request type bit from the data packets carrying the login request. As will be described below, the data stored at the login request type bit indicates whether the login request is from the application platform or the application. Based on such information, the proxy server determines whether it should communicate the login request to the application platform server or the application server.

At step S103, based on the source of the login request, the proxy server establishes a connection with the application platform server or the application server so as to share the login status between the application platform and the application. For example, when the login request is from the application platform, the proxy server establishes a connection with the application platform server and when the login request is from the application, the proxy server establishes a connection with the application server. By doing so, the proxy server becomes a "conduit" shared by the application platform and the application to communicate with their respective servers. After the application platform or the application logs into the corresponding server, the proxy server receives a corresponding login key from the server and records the login status of the application platform or the application. Moreover, the proxy server also forwards the login key to the other server such that the two servers, which may be within two different network domains, can share the login status information with each other.

Figure 2A:
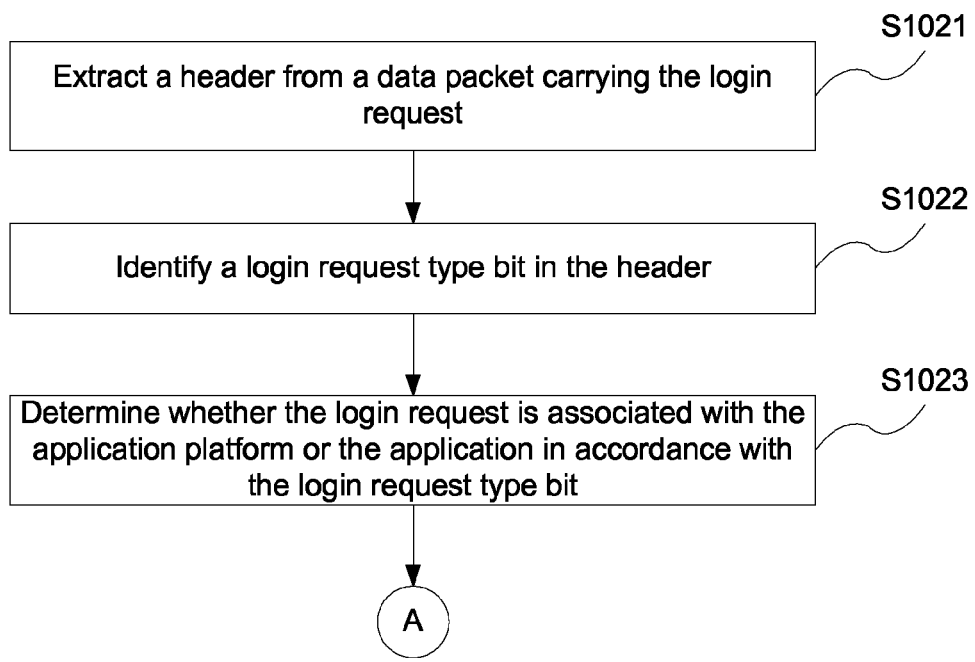
FIG. 2A is a flow chart illustrative of a method of determining the source of a login request in accordance with some embodiments.

FIG. 2A is a flow chart illustrative of a method of determining the source of a login request in accordance with some embodiments. As noted above, the proxy server needs to analyze the login request to determine which program, the application platform or the application, is responsible for initiating the login request. To do so, the proxy server first identifies the data packets carrying the login request. At step S1021, the proxy server extracts a header from a data packet carrying the login request. As will be described below, there is a format difference between the data packet associated with the application platform and the data packet associated with the application. For example, the data packet associated with the application platform is typically in the format of a text frame and the data packet associated with the application is typically in the format of a binary frame. At step S1022, the proxy server identifies a login request type bit in the header of the data packet. More details of this step are provided below. At step S1023, the proxy server determines whether the login request is associated with the application platform or the application in accordance with the login request type bit.

Figure 2B:
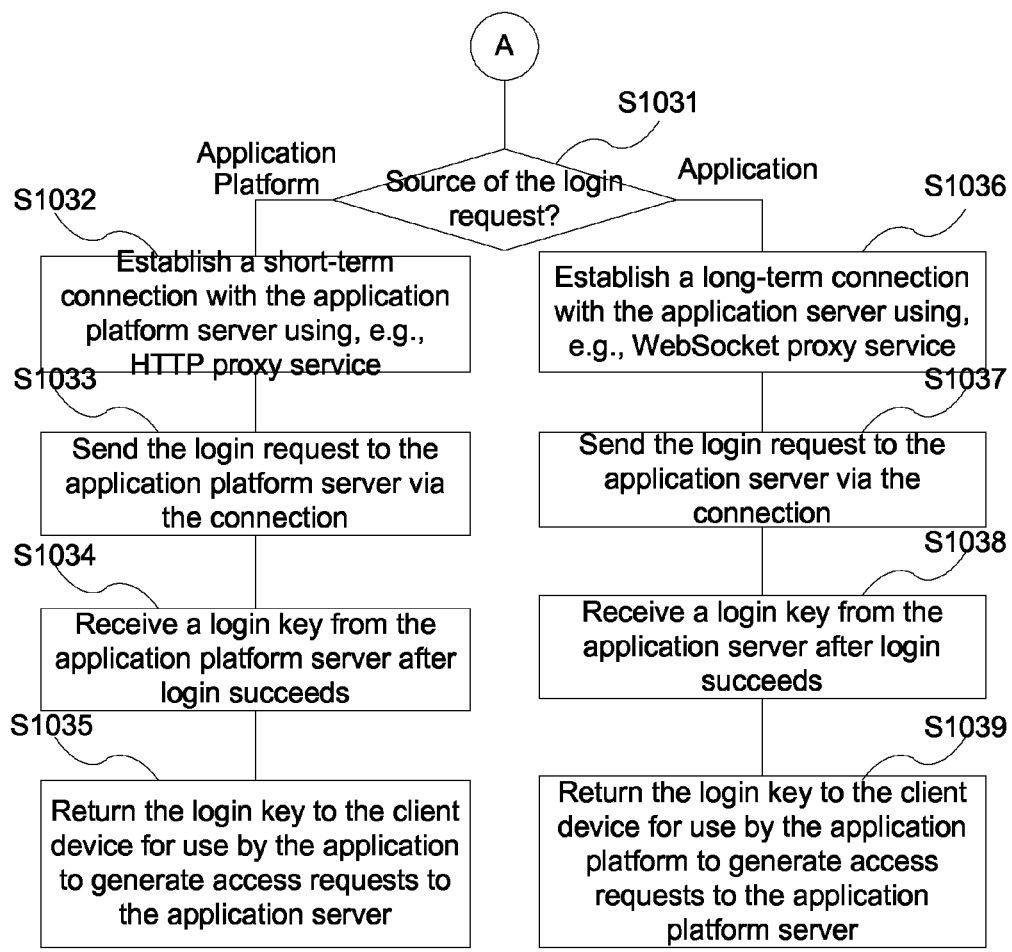
FIG. 2B is a flow chart illustrative of a method of establishing connections with an application platform server or an application server and completing the login operation with the server based on the source of the login request in accordance with some embodiments.

FIG. 2B is a flow chart illustrative of a method of establishing connections with an application platform server or an application server and completing the login operation with the server based on the source of the login request in accordance with some embodiments. At step S1031, the proxy server determines the source of the login request. If the login request is from the application platform, the proxy server then moves to step S1032; if the login request is from the application, the proxy server then performs the operation corresponding to step S1036. At step S1032, the proxy server establishes a short-term connection with the application platform server using, e.g., the HTTP proxy service. At step S1033, the proxy server sends the login request to the application platform server via the connection. At step S1034, the proxy server receives a login key from the application platform server after the login request succeeds. At step S1035, the proxy server returns the login key to the client device that submits the login request. In some embodiments, the login key is cached at the client device (e.g., in the local storage) and provided to the application. When the user activates the application, the application retrieves the login key from the memory of the client device and checks whether it is still valid or not. If the login key is still valid (e.g., the term of life has not expired yet), the application will not prompt the user for providing login information (e.g., username and password). Instead, the application sends an access request including the login key to the proxy server directly. Upon receipt of the access request, the proxy server also checks whether the access request includes a valid login key and, if so, forwards the access request to the corresponding application server. Finally, the application server, upon receipt of the access request, performs authentication operation by comparing the login key with the login key it receives from the proxy server previously. If a match is found, the application server will perform operations in accordance with instructions in the access request without requesting further proof of the validity of the access request from the proxy server or the client device.

Similarly, at step S1036, the proxy server establishes a long-term connection with the application platform server using, e.g., the WebSocket proxy service. At step S1037, the proxy server sends the login request to the application server via the connection. At step S1038, the proxy server receives a login key from the application server after the login request succeeds. At step S1039, the proxy server returns the login key to the client device that submits the login request. In some embodiments, the login key is cached at the client device (e.g., in the local storage) and provided to the application platform. When the user activates the application platform, the application platform retrieves the login key from the memory of the client device and checks whether it is still valid or not. If the login key is still valid (e.g., the term of life has not expired yet), the application platform will not prompt the user for providing login information (e.g., username and password). Instead, the application platform sends an access request including the login key to the proxy server directly. Upon receipt of the access request, the proxy server also checks whether the access request includes a valid login key and, if so, forwards the access request to the corresponding application platform server. Finally, the application platform server, upon receipt of the access request, performs authentication operation by comparing the login key with the login key it receives from the proxy server previously. If a match is found, the application platform server performs operations in accordance with instructions in the access request without requesting further proof of the validity of the access request from the proxy server or the client device.

In some embodiments, the relationship between the application platform and the application is asymmetric. In other words, the login key provided by the application platform server may be used for accessing the application server but the login key provided by the application server may not be used for accessing the application platform server or may provide limited access to the information in the application platform server. For example, the user may not be allowed to access the financial information (e.g., bank account or credit card number) associated with the user and stored in the application platform server unless the user provides the username and password registered at the application platform server, which may be different from the user account information at the application server.

Figure 3:
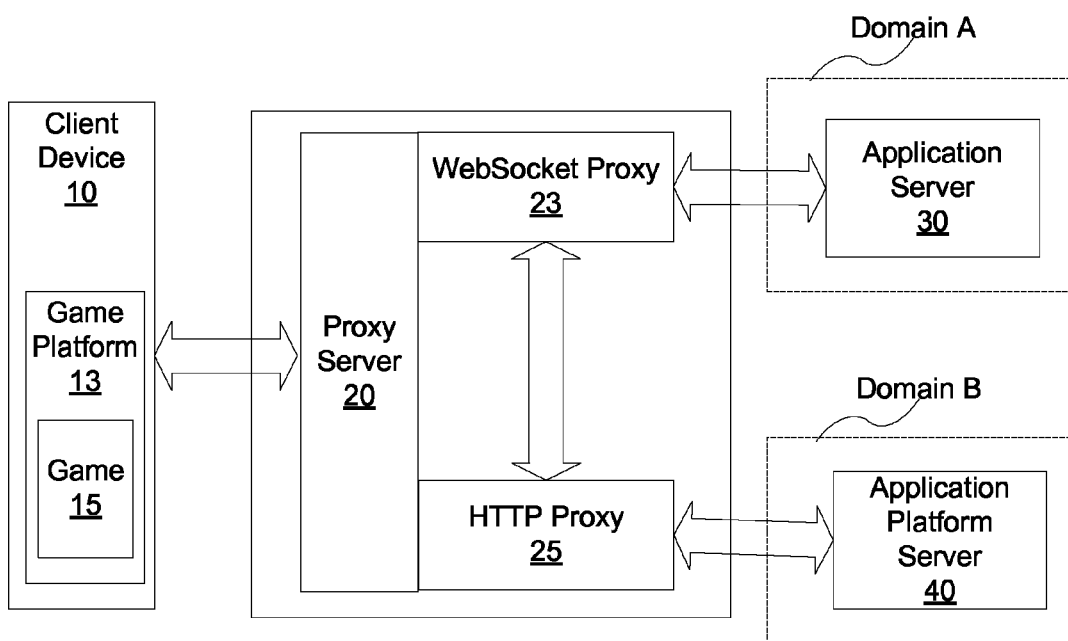
FIG. 3 is a block diagram illustrative of a client-server network environment for implementing the mechanism of sharing login status between the application platform server and the application server in accordance with some embodiments.

FIG. 3 is a block diagram illustrative of a client-server network environment for implementing the mechanism of sharing login status between the application platform server and the application server in accordance with some embodiments. In this example, the client device 10 has multiple programs such as an online game platform 13 and a specific online game 15. In particular, the specific online game 15 is one of multiple games managed by the online game platform 13. The online game platform 13 corresponds to the application platform server 40 (in the network domain B) and the game 15 corresponds to the application server 30 (in the network domain A). In order to let the online game platform 13 and the game 15 share login status information, a proxy server 20 is positioned between the client device 10 and the servers 30 and 40. There is a WebSocket connection between the client device 10 and the proxy server 20. Based on analyzing the access request (including a login request), the proxy server 20 determines whether the request is from the online game platform 13 or the game 15 and invokes a corresponding operation mode to communicate with the application server 30 or the application platform server 40.

For example, if the access request is a login request from the online game platform 13, the proxy server 20 establishes a short-term connection with the application platform server 40 using the HTTP proxy service 25, which may be realized using the AJAX technology; if the access request is a login request from the game 15, the proxy server 20 establishes a long-term connection with the application server 30 using the WebSocket proxy service 23. In some embodiments, a webpage associated with the online game platform 13 has a <Window> object that includes an embedded <iframe> object. Both objects share the WebSocket connection with the proxy server 20. If the login request is from the online game platform 13, there is a corresponding bit in the data packet indicating so and the proxy server 20 then communicates with the application platform server 40. But when the user uses the same webpage to access the application server 30, the access request will replace the bit with a different one. In response, the proxy server 20 communicates with the application server 30 through a corresponding connection.

As noted above, depending on whether an access request is from the online game platform 13 or the game 15, the data packet may be in the format of text frame or binary frame as shown below in Table 1 and Table 2, respectively.

TABLE 1

| Text Frame | | | |
|---|---|---|---|
| MsgHead | MsgBody | | MsgEnd |
| MsgID 0x00 One Byte | MsgCodeType 'j' One Byte | MsgSeq Variable Length | ParamLen 0xFF One Byte |

TABLE 2

| Binary Frame | | | |
|---|---|---|---|
| MsgHead | MsgBody | | MsgEnd |
| MsgID 0x80 One Byte | MsgCodeType 'b' One Byte | MsgSeq Variable Length | ParamLen Null |

In some embodiments, a text frame begins with one byte 0x00 and ends with one byte 0xFF. The message body in the text frame is converted into the UTF8 format and the label "j" indicates that the message indicates that the message is encoded using the JSON standard. In contrast, a binary frame begins with one byte 0x80 and ends with Null. The label "b" indicates that the message indicates that the message is encoded using the base64 standard.

Upon receipt of a login request, the proxy server 20 determines whether the request is from the online game platform 13 or the game 15, with '0x00' or 'j' indicating the request from the online game platform 13 and '0x80' or 'b' indicating the request from the game 15. For example, the proxy server analyzes the data packet and determines that the label in the second byte is 'j,' indicating that the login request is from the online game platform 13. Next the proxy server 20 forwards the request to the HTTP Proxy service 25. Otherwise or if the label in the second byte is 'b,' the proxy server 20 forwards the request to the WebSocket Proxy service 23. After determining the source of the login request, the proxy server 20 establishes a connection with a corresponding server and passes the subsequent data packets to the server. In this case, the proxy server 20 does not need to perform any further analysis of the data packets. When it receives the data packets from the server (which may be a response to the login request), the proxy server 20 checks whether the data packets include the corresponding label 'j' or 'b' and, if not, adds the label to the data packet so that the client device can determine whether the response is from the application platform server 40 (label 'j') or from the application server 30 (label 'b').

After the online game platform 13 logs into the application platform server 40, the proxy server 20 also uses the LocalStorage to store the login key returned by the server 40. Subsequently, when the user tries to access the application server 30 from the same client device 10, the proxy server 20 adds the login key to the URL associated with the application server 30 so that the user can access the application server 30 using the login key provided by the application platform server 40. In some embodiments, when a backend server 30 or 40 authenticates a login request, it may invoke a verification process by pushing a verification code to the client device 10 if a predefine condition (e.g., frequent login requests) is triggered. The login request is authenticated only after the verification code passes the test. After the login request is authenticated, the client device 10 can communicate more data with the corresponding backend servers.

Figure 4:
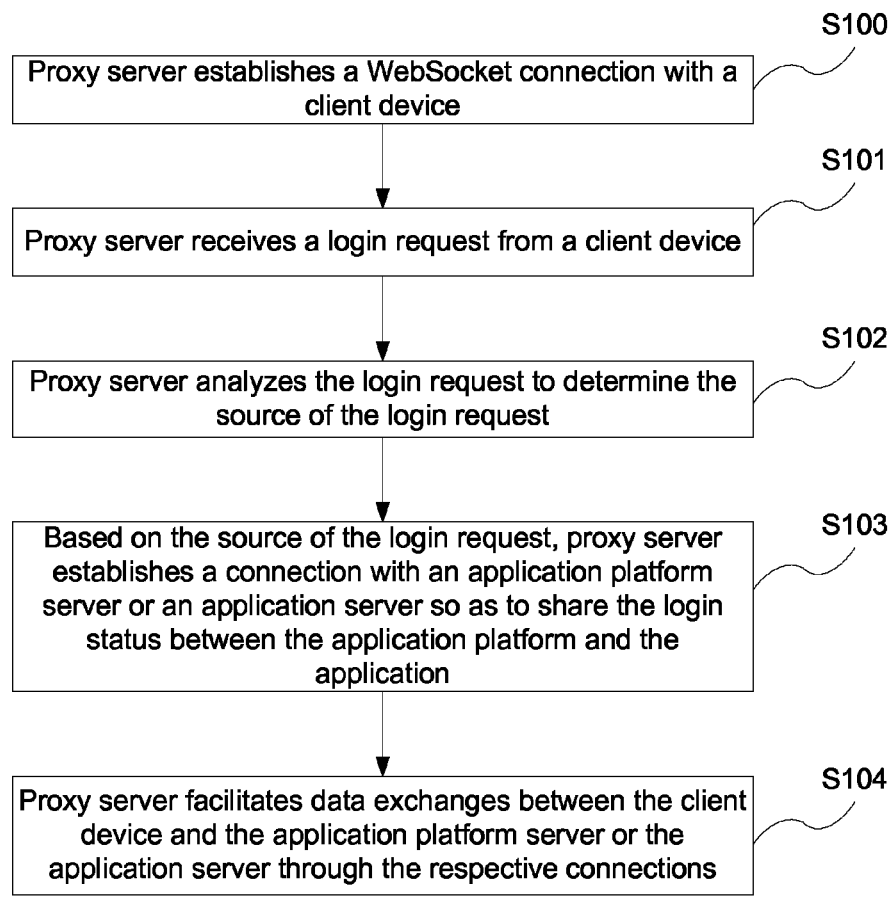
FIG. 4 is another flow chart illustrative of a method of sharing login status information between an application platform and an application in accordance with some embodiments.

FIG. 4 is another flow chart illustrative of a method of sharing login status information between an application platform and an application in accordance with some embodiments. Before the step S101, the proxy server establishes a WebSocket connection with the client device at step S100. After step S103, the proxy server facilitates data exchanges between the client device and the application platform server or the application server through the respective connections at step S104. For example, the proxy server 20 analyzes the data packets corresponding to the data exchanges from the client device 10 and determines whether they are from the game platform 13 or the game 15 based on the label described above.

Figure 5:
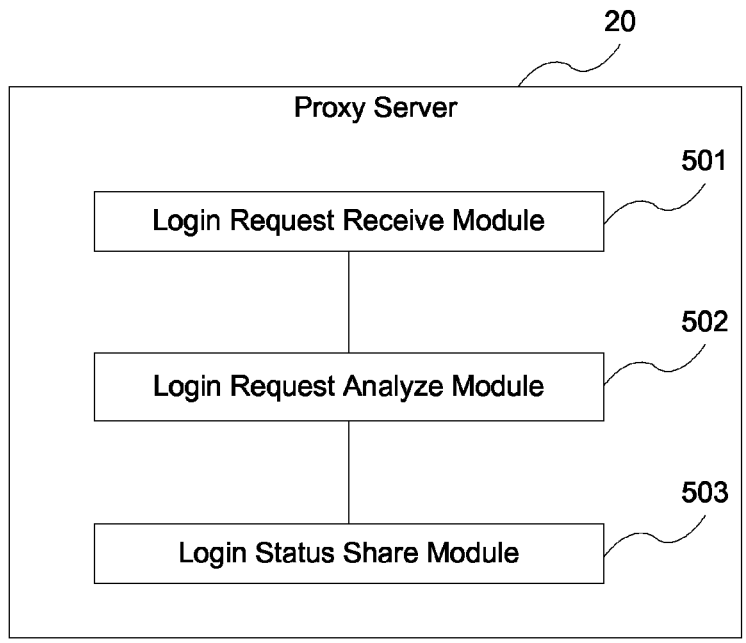
FIG. 5 is a block diagram illustrative of the components of the proxy server shown in FIG. 3 in accordance with some embodiments.

FIG. 5 is a block diagram illustrative of the components of the proxy server 20 shown in FIG. 3 in accordance with some embodiments. In this example, the proxy server 20 includes a login request receive module 501, a login request analyze module 502, and a login status share module 503.

The login request receive module 501 is configured to receive a login request from a client device. As noted above, there is a WebSocket connection between the client device and the proxy server. A user first submits a login request from one of the application platform and the application to the proxy server using the WebSocket connection if the user has not logged into either server before. In some embodiments, the login request includes one or more related data packets and at least one of the data packets includes a login request type bit for the proxy server to determine which the login request is initiated by the application platform or the application.

The login request analyze module 502 is configured to analyze the login request to determine the source of the login request. For example, the login request analyze module 502 exacts the login request type bit from the data packets carrying the login request. As will be described below, the data stored at the login request type bit indicates whether the login request is from the application platform or the application. Based on such information, the login request analyze module 502 determines whether it should communicate the login request to the application platform server or the application server.

The login status share module 503 is configured to establish a connection with the application platform server or the application server based on the source of the login request so as to share the login status between the application platform and the application. For example, when the login request is from the application platform, the login status share module 503 establishes a connection with the application platform server and when the login request is from the application, the login status share module 503 establishes a connection with the application server. By doing so, the proxy server becomes a "conduit" shared by the application platform and the application to communicate with their respective servers. After the application platform or the application logs into the corresponding server, the login status share module 503 receives a corresponding login key from the server and records the login status of the application platform or the application. Moreover, the login status share module 503 also forwards the login key to the other server such that the two servers, which may be within two different network domains, can share the login status information with each other.

Figure 6:
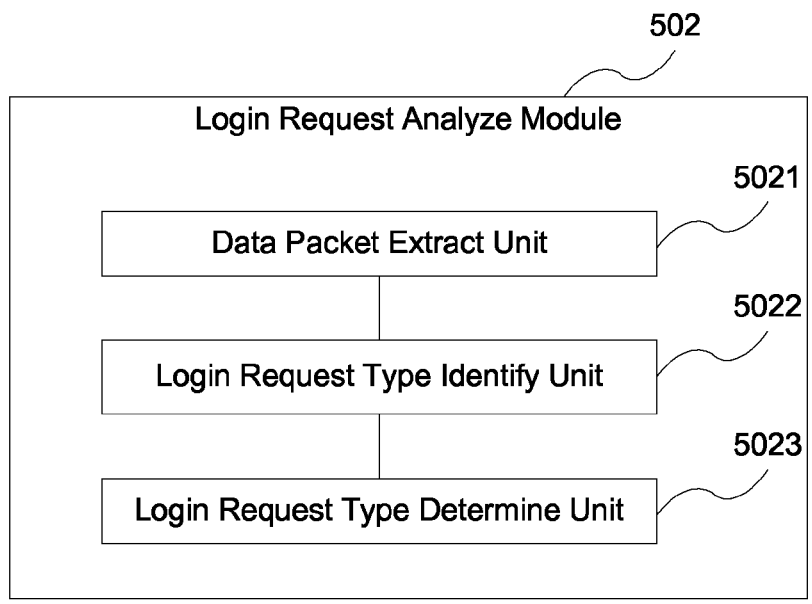
FIG. 6 is a block diagram illustrative of the components of a login request analyze module in the proxy server shown in FIG. 5 in accordance with some embodiments.

FIG. 6 is a block diagram illustrative of the components of the login request analyze module 502 in the proxy server shown in FIG. 5 in accordance with some embodiments. In this example, the login request analyze module 502 includes a data packet extract unit 5021, a login request type identify unit 5022, and a login request type determine unit 5023. The data packet extract unit 5021 is configured to extract a header from a data packet carrying the login request. The login request type identify unit 5022 is configured to identify a login request type bit in the header of the data packet. The login request type determine unit 5023 is configured to determine whether the login request is associated with the application platform or the application in accordance with the login request type bit.

Figure 7:
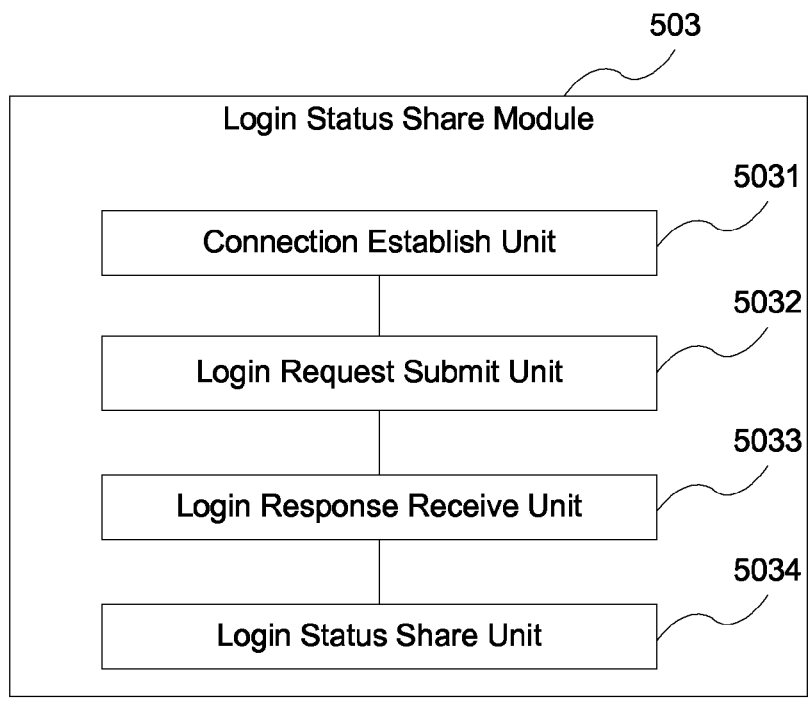
FIG. 7 is a block diagram illustrative of the components of a login status share module in the proxy server shown in FIG. 5 in accordance with some embodiments.

FIG. 7 is a block diagram illustrative of the components of a login status share module 503 in the proxy server shown in FIG. 5 in accordance with some embodiments. In this example, the login status share module 503 includes a connection establish unit 5031, a login request submit unit 5032, a login response receive unit 5033, and a login status share unit 5034. The connection establish unit 5031 is configured to establish a short-term connection with the application platform server using, e.g., the HTTP proxy service or establish a long-term connection with the application platform server using, e.g., the WebSocket proxy service. The login request submit unit 5032 is configured to send the login request to the application platform server via the corresponding connection or send the login request to the application server via the corresponding connection. The login response receive unit 5033 is configured to receive a login key from the application platform server or the application server after the login request succeeds. The login status share unit 5034 is configured to return the login key to the client device that submits the login request.

Figure 8:
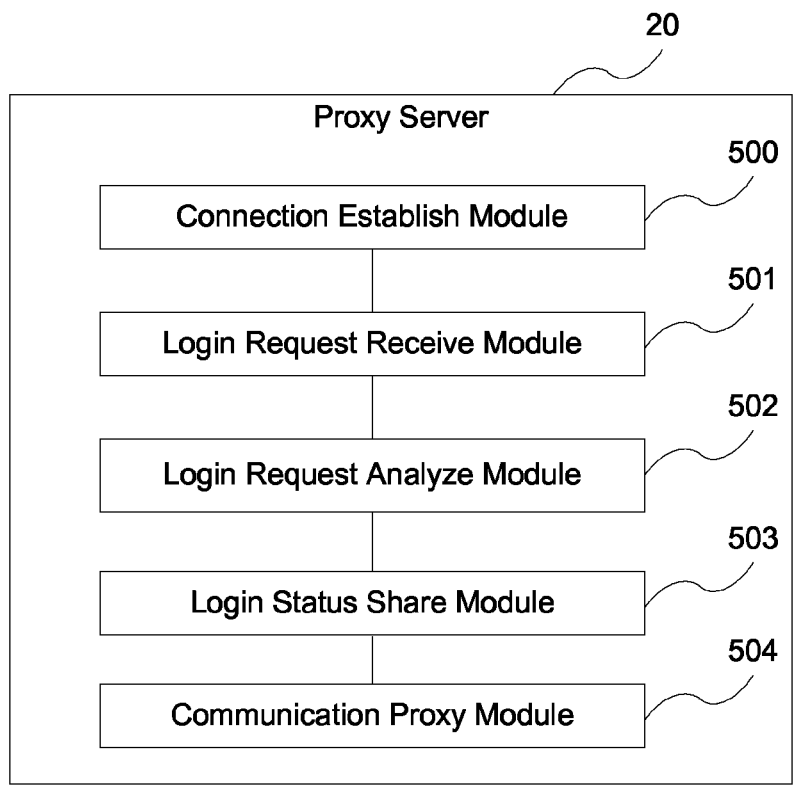
FIG. 8 is another block diagram illustrative of the components of the proxy server shown in FIG. 3 in accordance with some embodiments.

FIG. 8 is another block diagram illustrative of the components of the proxy server shown in FIG. 3 in accordance with some embodiments. Besides the modules described above in connection with FIG. 5, the proxy server also includes a connection establish module 500 for establishing a WebSocket connection with the client device and a communication proxy module 504 for facilitating data exchanges between the client device and the application platform server or the application server through the respective connections.

Figure 9:
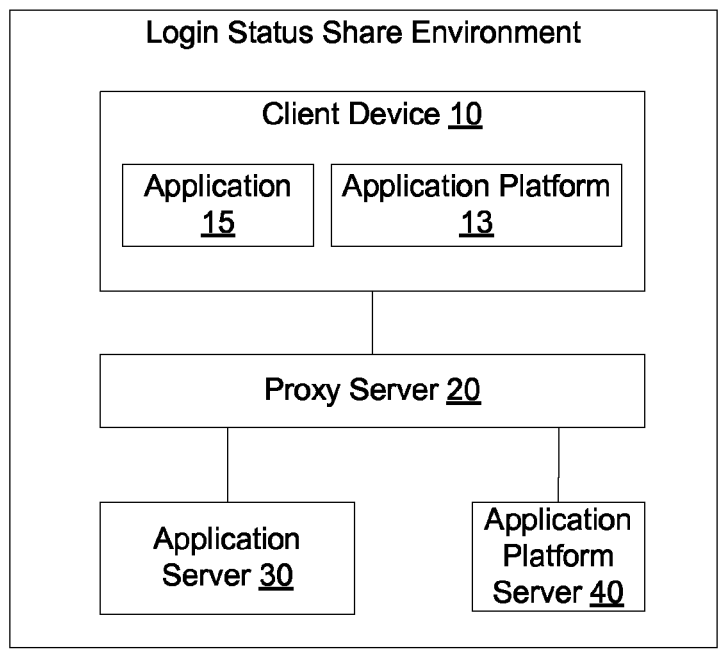
FIG. 9 is another block diagram illustrative of a client-server network environment for implementing the mechanism of sharing login status between the application platform server and the application server in accordance with some embodiments.

FIG. 9 is another block diagram illustrative of a client-server network environment for implementing the mechanism of sharing login status between the application platform server and the application server in accordance with some embodiments. The client device 10 sends a login request to the proxy server 20. Upon receipt of the login request, the proxy server determines whether the request is from the application 15 or the application platform 13 and then establishes a connection with the corresponding server (application server 30 or the application platform server 40) accordingly. If the request is directed to the application platform server 40, the application platform server 40 processes the login request to authenticate the user's access to the application platform server 40; if the request is directed to the application server 30, the application server 30 processes the login request to authenticate the user's access to the application server 30. The application platform server 30 or the application server 40 then returns a login key to the proxy server 20. On the one hand, the proxy server 20 returns the login key to the client device 10 so that a future access request may use the login key without having to provide more user account information. This can significantly enhance the security of the confidential information stored at the servers. On the other hand, the proxy server 20 saves the login key at its LocalStorage and forwards the login key to the other server for future authentication purpose. By doing so, more network bandwidth is saved from performing authentication required by the conventional cross-domain visits.

Figure 10:
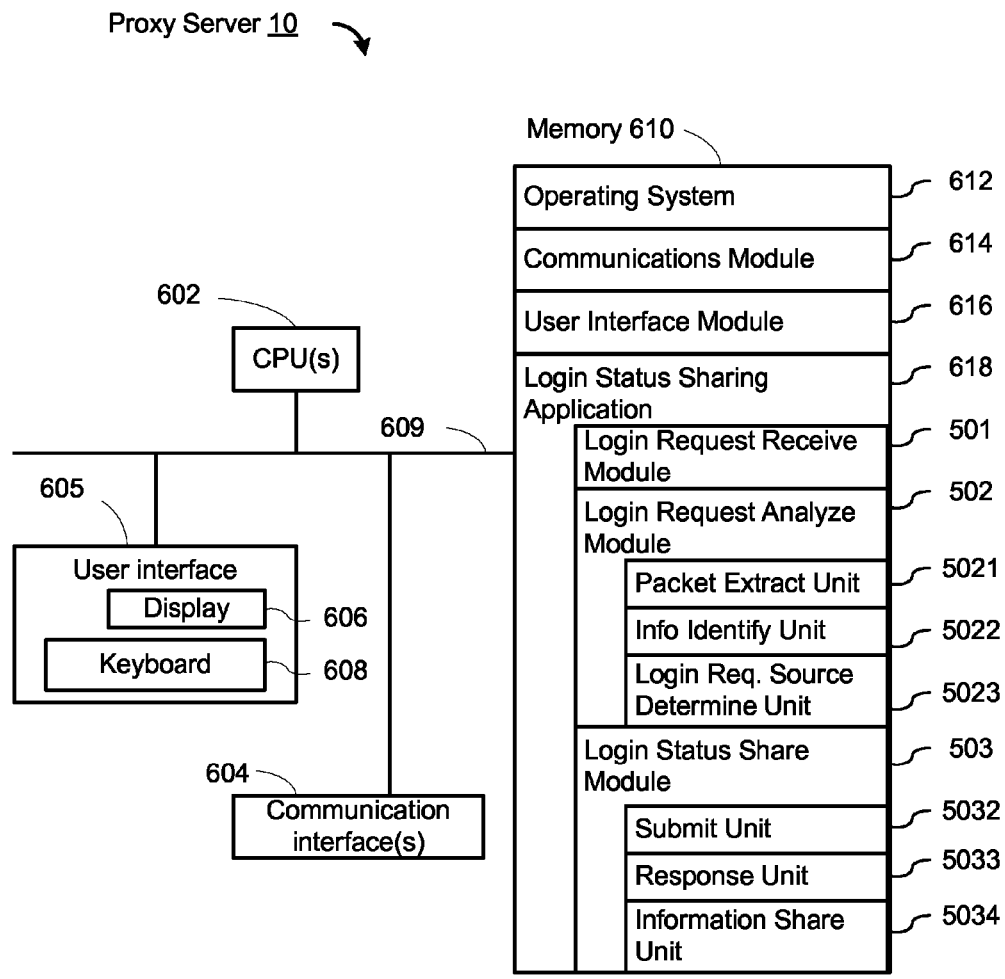
FIG. 10 is yet another block diagram illustrative of the components of the proxy server shown in FIG. 3 in accordance with some embodiments.

FIG. 10 is yet another block diagram illustrative of the components of the proxy server shown in FIG. 3 in accordance with some embodiments. The computing device 600 typically includes one or more processing units (CPU's) 602, one or more network or other communications interfaces 604, memory 610, and one or more communication buses 609 for interconnecting these components. The communication buses 609 may include circuitry (sometimes called a chipset) that interconnects and controls communications between system components. The computing device 600 may include a user input device 605, for instance, a display 606 and a keyboard 608. Memory 610 may include high speed random access memory and may also include non-volatile memory, such as one or more magnetic disk storage devices. Memory 610 may include mass storage that is remotely located from the CPU's 602. In some embodiments, memory 602, or alternately the non-volatile memory device(s) within memory 602, comprises a non-transitory computer readable storage medium. Memory 602 or the computer readable storage medium of memory 602 stores the following elements, or a subset of these elements, and may also include additional elements:

- an operating system 612 that includes procedures for handling various basic system services and for performing hardware dependent tasks;
- a network communication module 614 that is used for connecting the computing device 600 to a remote server (e.g., a on-line game server) or other computers via one or more communication networks (wired or wireless), such as the Internet, other wide area networks, local area networks, metropolitan area networks, and so on;
- a user interface module 616 configured to receive user inputs through the user interface 605; and
- a login status sharing application 618 for allowing different programs at a client device to share their login status information; in some embodiments, the login status sharing application 618 further including:
  - a login request receive module 501 as described above in connection with FIGS. 1 and 5;
  - a login request analyze module 502 as described above in connection with FIGS. 1 and 5, the login request analyze module 502 further including a packet extract unit 5021, an information identify unit 5022, and a login request source determine unit 5023 as described above in connection with FIG. 6; and
  - a login status share module 503 as described above in connection with FIGS. 1 and 5, the login status share module 503 further including a submit unit 5032, a response unit 5033, and an information share unit 5034 as described above in connection with FIG. 7.

Note that the aforementioned method and system retrieve the event-triggering times from an audio file and the play time of the audio file and control the display of the event locations on the graphical user interface by comparing the event-triggering times and the play time. Because the play time is not a result of accumulating the times associated with different frames but corresponds to the current play position of the audio file, the time gap between the play time and event-triggering times associated with the conventional approach can be effectively avoided.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method, comprising:
   at a computer having one or more processors and memory storing programs executed by the one or more processors,
   receiving a login request from a client device;
   analyzing the login request to determine whether the login request is associated with an application platform at the client device or an application at the client device, wherein the application is managed by the application platform;
   if the login request is associated with the application platform:
      establishing a first connection with an application platform server;
      forwarding the login request to the application platform server;
      receiving a login key from the application platform server; and
      returning the login key to the client device, wherein the login key is associated with the application platform;
   if the login request is associated with the application:
      establishing a second connection with an application server, wherein the application server is distinct from the application platform server;
      forwarding the login request to the application server;
      receiving a login key from the application server; and
      returning the login key to the client device, wherein the login key is associated with the application,
   wherein analyzing the login request further includes:
      extracting a header from a data packet carrying the login request;
      identifying a login request type bit in the header; and
      determining whether the login request is associated with the application platform or the application in accordance with the login request type bit, and
   the data packet carrying the login request associated with the application platform is in the format of one or more text frames and the data packet carrying the login request associated with the application is in the format of one or more binary frames.

2. The computer-implemented method of claim 1, further comprising:
   if the login request is associated with the application platform:
      forwarding the login key to the application server, wherein the login key is used for authenticating an access request associated with the application; and
   if the login request is associated with the application:
      forwarding the login key to the application platform server, wherein the login key is used for authenticating an access request associated with the application platform.

3. The computer-implemented method of claim 1, further comprising:
   receiving a response to the login request from one of the application platform server and the application server;
   updating the response by adding a login request type bit to the response, wherein the login request type bit indicates whether the response is from the application platform server or the application server; and
   forwarding the updated response to the client device, wherein the login request type bit indicates whether the response should be processed by the application platform or the application.

4. The computer-implemented method of claim 1, wherein the login request is transmitted from the client device to the computer via a WebSocket protocol-based connection.

5. The computer-implemented method of claim 1, wherein the first connection with the application platform server is a short-term connection and the second connection with the application server is a long-term connection, the short-term connection lasting shorter than the long-term connection in time.

6. The computer-implemented method of claim 5, wherein the first connection is implemented in accordance with Asynchronous JavaScript And XML (AJAX) protocol and the second connection is implemented in accordance with WebSocket protocol.

7. A computer system, comprising:
   one or more processors;
   memory; and one or more programs stored in the memory and configured for execution by the one or more processors, the one or more programs including instructions for:
   receiving a login request from a client device;
   analyzing the login request to determine whether the login request is associated with an application platform at the client device or an application at the client device, wherein the application is managed by the application platform;
   if the login request is associated with the application platform:
      establishing a first connection with an application platform server;
      forwarding the login request to the application platform server;
      receiving a login key from the application platform server; and
      returning the login key to the client device, wherein the login key is associated with the application platform;
   if the login request is associated with the application:
      establishing a second connection with an application server, wherein the application server is distinct from the application platform server;
      forwarding the login request to the application server;
      receiving a login key from the application server; and returning the login key to the client device, wherein the login key is associated with the application, wherein analyzing the login request further includes:
extracting a header from a data packet carrying the login request;
identifying a login request type bit in the header; and
determining whether the login request is associated with the application platform or the application in accordance with the login request type bit, and the data packet carrying the login request associated with the application platform is in the format of one or more text frames and the data packet carrying the login request associated with the application is in the format of one or more binary frames.

8. The computer system of claim 7, wherein the one or more programs further include instructions for:
if the login request is associated with the application platform:
forwarding the login key to the application server, wherein the login key is used for authenticating an access request associated with the application; and
if the login request is associated with the application:
forwarding the login key to the application platform server, wherein the login key is used for authenticating an access request associated with the application platform.

9. The computer system of claim 7, wherein the one or more programs further include instructions for:
receiving a response to the login request from one of the application platform server and the application server;
updating the response by adding a login request type bit to the response, wherein the login request type bit indicates whether the response is from the application platform server or the application server; and
forwarding the updated response to the client device, wherein the login request type bit indicates whether the response should be processed by the application platform or the application.

10. The computer system of claim 7, wherein the login request is transmitted from the client device to the computer via a WebSocket protocol-based connection.

11. The computer system of claim 7, wherein the first connection with the application platform server is a short-term connection and the second connection with the application server is a long-term connection, the short-term connection lasting shorter than the long-term connection in time.

12. The computer system of claim 11, wherein the first connection is implemented in accordance with AJAX protocol and the second connection is implemented in accordance with WebSocket protocol.

13. A non-transitory computer readable storage medium, storing one or more programs for execution by one or more processors of a computer system, the one or more programs including instructions for:
receiving a login request from a client device;
analyzing the login request to determine whether the login request is associated with an application platform at the client device or an application at the client device, wherein the application is managed by the application platform;

if the login request is associated with the application platform:
establishing a first connection with an application platform server;
forwarding the login request to the application platform server;
receiving a login key from the application platform server; and
returning the login key to the client device, wherein the login key is associated with the application platform;
if the login request is associated with the application:
establishing a second connection with an application server, wherein the application server is distinct from the application platform server;
forwarding the login request to the application server;
receiving a login key from the application server; and
returning the login key to the client device, wherein the login key is associated with the application, wherein analyzing the login request further includes:
extracting a header from a data packet carrying the login request;
identifying a login request type bit in the header; and
determining whether the login request is associated with the application platform or the application in accordance with the login request type bit, and the data packet carrying the login request associated with the application platform is in the format of one or more text frames and the data packet carrying the login request associated with the application is in the format of one or more binary frames.

14. The non-transitory computer readable storage medium of claim 13, wherein the one or more programs further include instructions for:
if the login request is associated with the application platform:
forwarding the login key to the application server, wherein the login key is used for authenticating an access request associated with the application; and
if the login request is associated with the application:
forwarding the login key to the application platform server, wherein the login key is used for authenticating an access request associated with the application platform.

15. The non-transitory computer readable storage medium of claim 13, wherein the one or more programs further include instructions for:
receiving a response to the login request from one of the application platform server and the application server;
updating the response by adding a login request type bit to the response, wherein the login request type bit indicates whether the response is from the application platform server or the application server; and
forwarding the updated response to the client device, wherein the login request type bit indicates whether the response should be processed by the application platform or the application.

16. The non-transitory computer readable storage medium of claim 13, wherein the first connection with the application platform server is a short-term connection and the second connection with the application server is a long-term connection, the short-term connection lasting shorter than the long-term connection in time.

* * * * *